US008761791B2

(12) United States Patent
Zhou et al.

(10) Patent No.: US 8,761,791 B2
(45) Date of Patent: Jun. 24, 2014

(54) RESOURCES ALLOCATION METHOD AND APPARATUS FOR MULTIPLE RADIO REMOTE UNITS SHARING A CELL (71) Applicant: Huawei Technologies Co., Ltd., Guangdong (CN)

(72) Inventors: Pengbin Zhou, Chengdu (CN); Wei Li, Chengdu (CN); Longke He, Chengdu (CN); Dingwei Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 13/717,083

(22) Filed: Dec. 17, 2012

(65) Prior Publication Data

US 2013/0109402 A1 May 2, 2013

Related U.S. Application Data (63) Continuation of application No. PCT/CN2011/079843, filed on Sep. 19, 2011.

(51) Int. Cl.
H04W 24/00 (2009.01)
H04W 28/04 (2009.01)

(52) U.S. Cl.
USPC ............ 455/452.2; 455/422.1; 455/403; 455/450; 455/452.1; 370/329; 370/341; 370/331

(58) Field of Classification Search
USPC .................................. 455/452.2
See application file for complete search history.

(56) References Cited

U.S. PATENT DOCUMENTS 5,541,979 A * 7/1996 Leslie et al. ............ 455/436
5,657,487 A * 8/1997 Doner .................... 455/456.2
5,850,609 A * 12/1998 Sugarbroad et al. ..... 455/456.1

(Continued)

FOREIGN PATENT DOCUMENTS

CN 101448306 A 6/2009
CN 101854643 A 10/2010

(Continued)

OTHER PUBLICATIONS

International Search Report in corresponding International Patent Application No. PCT/CN2011/079843 (Jun. 14, 2012).

(Continued)

Primary Examiner — Lester Kincaid
Assistant Examiner — Diego Herrera
(74) Attorney, Agent, or Firm — Leydig, Voit & Mayer, Ltd.

(57) ABSTRACT

A resources allocation method for a user equipment is provided. The user equipment locates in a cell and multiple radio remote units share the cell. The method includes: measuring a test value of a reference signal of the user equipment in the cell under each radio remote unit; calculating a difference between the test value of the reference signal of the user equipment under the work radio remote unit and that of the reference signal under another radio remote unit in the cell; if the difference is not smaller than a preset value, the radio remote unit with the maximum test value is the only work radio remote unit, and if the difference is smaller than the preset value, the another radio remote unit is selected as another work radio remote unit. An apparatus of resources allocation for a user equipment is also provided.

9 Claims, 4 Drawing Sheets

In a cell with multiple radio remote units, measure a test value of a reference signal of a user equipment under each radio remote unit in the cell — S101

Select a radio remote unit with the maximum test value as a work radio remote unit of the user equipment — S102

(56) References Cited

U.S. PATENT DOCUMENTS

| | | | |
|---|---|---|---|
| 6,240,294 B1* | 5/2001 | Hamilton et al. | 455/456.3 |
| 6,714,789 B1* | 3/2004 | Oh et al. | 455/456.1 |
| 6,888,811 B2* | 5/2005 | Eaton et al. | 370/338 |
| 7,092,722 B1* | 8/2006 | Oh et al. | 455/456.1 |
| 7,359,715 B2* | 4/2008 | Choksi | 455/456.1 |
| 2002/0082017 A1* | 6/2002 | Hattori | 455/436 |
| 2002/0123352 A1* | 9/2002 | Vayanos et al. | 455/456 |
| 2003/0017831 A1* | 1/2003 | Lee et al. | 455/453 |
| 2004/0067759 A1* | 4/2004 | Spirito et al. | 455/456.1 |
| 2004/0157561 A1* | 8/2004 | Akerberg | 455/67.11 |
| 2005/0058151 A1* | 3/2005 | Yeh | 370/445 |
| 2005/0059437 A1* | 3/2005 | Son et al. | 455/574 |
| 2005/0101333 A1* | 5/2005 | Raith | 455/456.1 |
| 2005/0130677 A1* | 6/2005 | Meunier et al. | 455/456.6 |
| 2006/0276205 A1* | 12/2006 | Bengtsson | 455/457 |
| 2007/0099632 A1* | 5/2007 | Choksi | 455/456.1 |
| 2009/0098883 A1* | 4/2009 | Yoon | 455/456.1 |
| 2009/0111468 A1* | 4/2009 | Burgess et al. | 455/436 |
| 2010/0105409 A1* | 4/2010 | Agarwal et al. | 455/456.1 |
| 2010/0120415 A1* | 5/2010 | Urquhart et al. | 455/424 |
| 2010/0130125 A1* | 5/2010 | Nurmi | 455/41.1 |
| 2010/0130229 A1* | 5/2010 | Sridhara et al. | 455/456.1 |
| 2010/0205061 A1* | 8/2010 | Karmarkar | 705/14.64 |
| 2010/0302956 A1* | 12/2010 | Haverty | 370/252 |
| 2011/0076949 A1* | 3/2011 | Smith | 455/41.2 |

FOREIGN PATENT DOCUMENTS

| | | |
|---|---|---|
| CN | 102026382 A | 4/2011 |
| CN | 102083122 A | 6/2011 |
| WO | WO 00/28754 A1 | 5/2000 |

OTHER PUBLICATIONS

1st Office Action in corresponding Chinese Patent Application No. 201180001806.7 (Apr. 3, 2013).

* cited by examiner

| RRU0 | 1 | 0 | 1 | 1 | 0 | 0 | 0 | 0 | 0 | 0 |

| RRU1 | 0 | 2 | 0 | 0 | 0 | 0 | 0 | 2 | 0 | 0 |

| RRU2 | 0 | 2 | 0 | 0 | 0 | 0 | 0 | 2 | 0 | 0 |

FIG. 3

| RRU0 | 1 | 2 | 1 | 1 | 0 | 0 | 0 | 2 | 0 | 0 |

| RRU1 | 1 | 2 | 1 | 1 | 0 | 0 | 0 | 2 | 0 | 0 |

| RRU2 | 1 | 2 | 1 | 1 | 0 | 0 | 0 | 2 | 0 | 0 |

RESOURCES ALLOCATION METHOD AND APPARATUS FOR MULTIPLE RADIO REMOTE UNITS SHARING A CELL

CROSS-REFERENCE TO RELATED APPLICATION

This application is a continuation of International Patent Application No. PCT/CN2011/079843 filed on Sep. 19, 2011, which is hereby incorporated by reference in its entirety.

FIELD OF THE INVENTION

The present invention relates to the communications field, and in particular, to a resources allocation method and apparatus for multiple radio remote units sharing a cell.

BACKGROUND OF THE INVENTION

In a scenario where multiple RRUs (radio remote units) share a cell, although multiple RRUs under the same indoor baseband processing unit distribute at different station addresses, they are logically in the same cell. Therefore, cell parameters, such as the number of carriers, frequency point and channel configuration, of each RRU are the same. In this situation, for a downlink channel, each RRU transmits the same PDSCH/PDCCH (physical downlink shared channel/physical downlink control channel) signals; for an uplink channel, each RRU jointly receives or selectively receives PUCCH/PUSCH (physical uplink control channel/physical uplink shared channel) signals transmitted by a UE (user equipment).

In the process of implementing the preceding solution, the inventor finds at least the following problem in the prior art: In the situation where multiple RRUs share a cell, a user equipment may occupy all RRUs in the cell to send and receive signals. In this case, multiple downlink/uplink channels transmit/receive the same signals, resulting in waste of channel resources.

SUMMARY OF THE INVENTION

Embodiments of the present invention provide a resources allocation method and apparatus for multiple radio remote units sharing a cell, to solve the problem of a waste of channel resources in resources allocation for the multiple radio remote units sharing a cell.

To achieve the preceding objective, the following technical solutions are adopted in the embodiments of the present invention:

In one aspect, an embodiment of the present invention provides a resources allocation method for multiple radio remote units sharing a cell, including:

in the cell with multiple radio remote units, measuring a test value of a reference signal of a user equipment in the cell under each radio remote unit; and selecting a radio remote unit with the maximum test value as a work radio remote unit of the user equipment.

In another aspect, an embodiment of the present invention provides a resources allocation apparatus for multiple radio remote units sharing a cell, including:

a reference signal measurement unit, configured to measure a test value of a reference signal of a user equipment in a cell under each radio remote unit; and a selecting unit, configured to select a radio remote unit with the maximum test value measured by the reference signal measurement unit as a work radio remote unit of the user equipment.

According to the resources allocation method and apparatus for multiple radio remote units sharing a cell provided in the embodiments of the present invention, in a condition that multiple radio remote units share a cell, a corresponding work radio remote unit is selected for a user equipment according to a test value of a reference signal of the user equipment under each radio remote unit in the cell, thereby solving the problem of a waste of channel resources in resources allocation for the multiple radio remote units sharing a cell.

BRIEF DESCRIPTION OF THE DRAWINGS

To describe technical solutions in the embodiments of the present invention or in the prior art more clearly, the accompanying drawings required in descriptions about the embodiments or the prior art are briefly described below. Apparently, the accompanying drawings described below illustrate only some embodiments of the present invention, and a person skilled in the art may derive other accompanying drawings from these accompanying drawings without any creative effort.

DETAILED DESCRIPTION OF THE EMBODIMENTS

The technical solutions in the embodiments of the present invention are clearly and completely described below with reference to the accompanying drawings in the embodiments of the present invention. Apparently, the described embodiments are merely a part of the embodiments of the present invention, rather than all the embodiments of the present invention. All other embodiments obtained by a person skilled in the art based on the embodiments of the present invention without creative efforts shall fall within the protection scope of the present invention.

Embodiment 1

Figure 1:
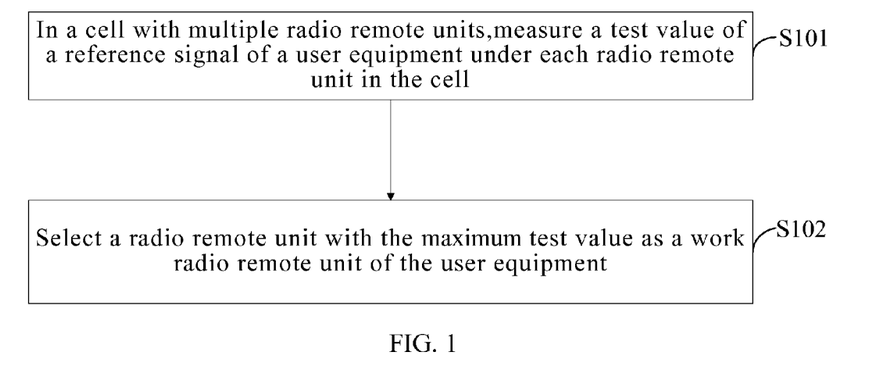
FIG. 1 is a flow chart of a resources allocation method for multiple radio remote units sharing a cell according to Embodiment 1 of the present invention.

This embodiment of the present invention provides a resources allocation method for multiple radio remote units sharing a cell. As shown in FIG. 1, steps of the method include:

S101. In a cell with multiple radio remote units, measure a test value of a reference signal of a user equipment under each radio remote unit in the cell.

S102. Select a radio remote unit with the maximum test value as a work radio remote unit of the user equipment.

It should be noted here that the test value of the reference signal in step S102 may be any one of the following: reference signal receiving power (RSRP); or signal to interference plus noise ratio (SINR) of a sounding reference signal (SRS); or signal to interference plus noise ratio (SINR) of a demodulation reference signal (DMRS).

In addition, in the following embodiments, a base station measures a test value of a reference signal of a user equipment under each radio remote unit in a cell. It should be noted that the base station here may be a base station in any one of the following scenarios: scenarios where multiple radio remote units share a cell whose standard is GSM (global system for mobile communications), UMTS (universal mobile telecommunications system), WIMAX (worldwide interoperability for microwave access), or another radio standard.

In the cell with multiple radio remote units, the base station selects a corresponding work radio remote unit for the user equipment. Therefore, channel resources allocation is performed only on the corresponding work radio remote unit for the user equipment.

The resources allocation method for multiple radio remote units sharing a cell provided in the embodiment of the present invention is capable of selecting, in a condition that multiple radio remote units share a cell, a corresponding work radio remote unit for a user equipment according to a test value of a reference signal of the user equipment under each radio remote unit in the cell, thereby reducing a waste of channel resources in resources allocation for the multiple radio remote units sharing a cell.

Embodiment 2

Figure 2:
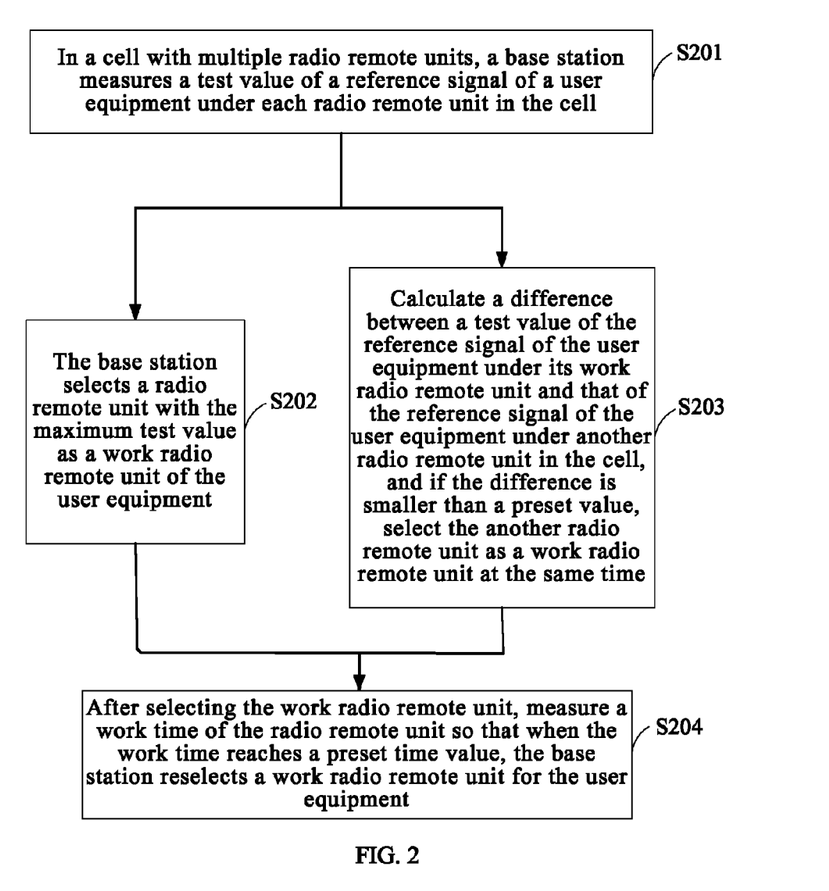
FIG. 2 is a flow chart of a resources allocation method for multiple radio remote units sharing a cell according to Embodiment 2 of the present invention.

This embodiment of the present invention provides a resources allocation method for multiple radio remote units sharing a cell. As shown in FIG. 2, steps of the method include:

S201. In a cell with multiple radio remote units, a base station measures a test value of a reference signal of a user equipment under each radio remote unit in the cell.

S202. The base station selects a radio remote unit with the maximum test value as a work radio remote unit of the user equipment.

S203. Calculate a difference between a test value of the reference signal of the user equipment under its work radio remote unit and that of the reference signal of the user equipment under another radio remote unit in the cell. If the difference is smaller than a preset value, select the another radio remote unit as a work radio remote unit at the same time.

It may be understood that, generally, when the user equipment is a center user of its work radio remote unit, the difference between the test value of the reference signal of the user equipment under its work radio remote unit and that of the reference signal of the user equipment under another radio remote unit may be comparatively large. In this situation, through the method in step 203, the base station may only select a unique work radio remote unit for the user equipment, and the user equipment may be referred to as an RRU center user. When the user equipment is an edge user of its work radio remote unit, the difference between the test value of the reference signal of the user equipment under its work radio remote unit and that of the reference signal of the user equipment under another radio remote unit may be comparatively small, and if the difference is smaller than the preset value, the base station may select multiple work radio remote units for the user equipment at the same time, and the user equipment may be referred to as an RRU edge user. In this manner, communication quality is ensured.

In addition, the test value of the reference signal in steps S202 and S203 may be any one of the following: reference signal receiving power (RSRP); or signal to interference plus noise ratio (SINR) of a sounding reference signal (SRS); or signal to interference plus noise ratio (SINR) of a demodulation reference signal (DMRS). Here, when the difference between the test value of the reference signal of the user equipment under the work radio remote unit and that of the reference signal of the user equipment under the another radio remote unit is calculated in step S203, the same type of test value is adopted.

S204. After selecting the work radio remote unit, the base station measures a work time of the radio remote unit, so that when the work time reaches a preset time value, the base station reselects a work radio remote unit for the user equipment.

Figure 3:
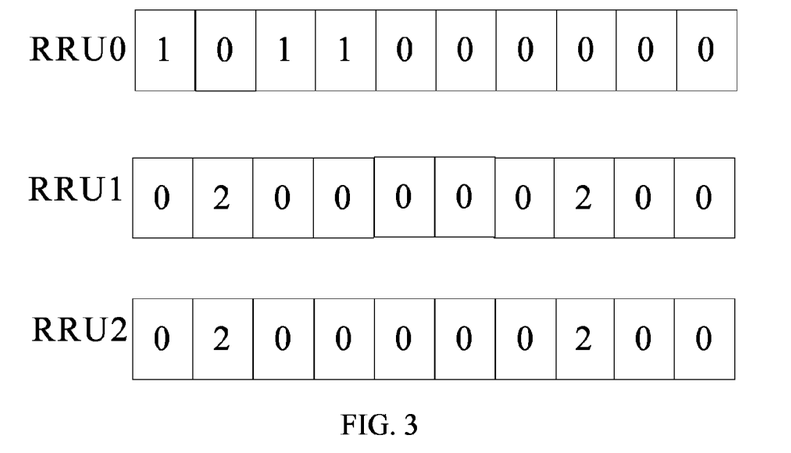
FIG. 3 is a bitmap of resources allocation for multiple radio remote units sharing a cell according to Embodiment 2 of the present invention.
Figure 4:
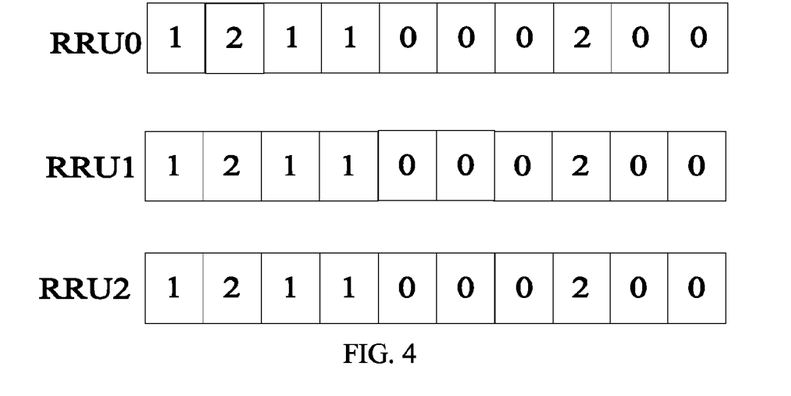
FIG. 4 is a bitmap of resources allocation for multiple radio remote units sharing a cell according to the prior art.

For example, three radio remote units RRU0, RRU1, and RRU2 exist in cell A, as shown in FIG. 3 and FIG. 4. Assume that each box in the figure represents an RB (resource block), (it may be understood that each box in the figure may also represent several RBs) the value 1 in the figure represents channel resources allocated to user equipment 1, the value 2 represents channel resources allocated to user equipment 2, and the value 0 represents unallocated channel resources. FIG. 3 is a bitmap of resources allocation for multiple radio remote units sharing a cell according to the embodiment of the present invention. FIG. 4 is a bitmap of resources allocation for multiple radio remote units sharing a cell according to the prior art. In a real scenario, a physical uplink channel and a physical downlink channel exist. In a cell according to the prior art, for the physical downlink channel, each RRU transmits the same PDSCH/PDCCH signals; for the physical uplink channel, each RRU jointly receives or selectively receives the same PUCCH/PUSCH signals transmitted by a user equipment.

Assume that the base station detects that a test value of a reference signal of user equipment 1 under RRU0 is the maximum. RRU0 is selected as a work RRU of user equipment 1; if the base station detects that differences between test values of the reference signals of user equipment 1 under the other two RRUs (RRU1, RRU2) and the test value of the reference signal under RRU0 are larger than a preset comparison value, the base station selects only RRU0 as the work RRU of user equipment 1. In this situation, assume that user equipment 1 occupies only channel resources of three RBs shown in FIG. 3. In the prior art shown in FIG. 4, however, user equipment 1 may occupy all RRUs (RRU0, RRU1, and RRU2) in the cell to send and receive signals. In this case, user equipment 1 occupies channel resources of nine RBs in the three RRUs. Therefore, the solution in this embodiment of the present invention saves channel resources.

In addition, assume that the base station selects the radio remote unit RRU1 with the maximum test value of the reference signal as a work RRU of user equipment 2. The base station measures test values of reference signals of user equipment 2 under the other two RRUs and finds that a difference between the test value of the reference signal under RRU2 and the test value of the reference signal under RRU1 is smaller than the preset comparison value. In that way, RRU2 is also set as a work RRU of user equipment 2. In this case, the base station selects RRU1 and RRU2 as work RRUs of user equipment 2, occupying channel resources of only four RBs as shown in the figure. In the prior art shown in FIG. 4, however, user equipment 1 may occupy all RRUs (RRU0, RRU1, and RRU2) in the cell to send and receive signals. In this case, user equipment 1 occupies channel resources of six RBs in all in the three RRUs. Therefore, the solution in this embodiment of the present invention saves channel resources. It may be understood that the number of RBs in this embodiment may be assumed data, while in the real scenario, the number of occupied RBs needs to be determined according to an actual situation, which is not limited in the present invention.

The test value of the reference signal described in this embodiment may be any one of the following: reference signal receiving power (RSRP); or signal to interference plus noise ratio (SINR) of a sounding reference signal (SRS); or signal to interference plus noise ratio (SINR) of a demodulation reference signal (DMRS).

According to the resources allocation method for multiple radio remote units sharing a cell provided in this embodiment of the present invention, in a condition that multiple radio remote units share a cell, the base station selects a corresponding work radio remote unit for a user equipment according to a test value of a reference signal of the user equipment under each radio remote unit in the cell, thereby reducing a waste of channel resources in resources allocation for the multiple radio remote units sharing a cell.

In addition, because the user equipment is a mobile device, adding the process of time measuring on the work radio remote unit is more beneficial to changing the work radio remote unit in time when the user equipment moves to a different location, thereby improving communication quality.

Embodiment 3

Figure 5:
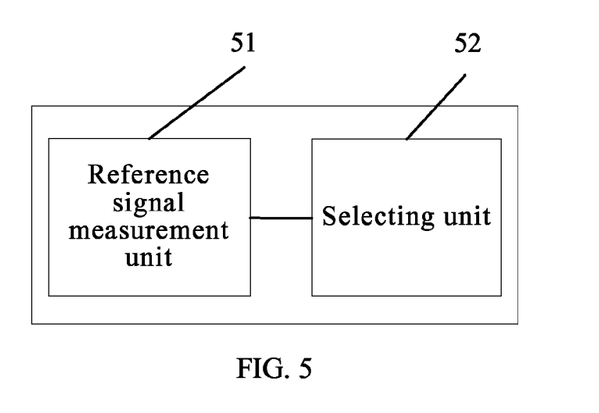
FIG. 5 is a block diagram of a resources allocation apparatus for multiple radio remote units sharing a cell according to Embodiment 3 of the present invention.

This embodiment of the present invention provides a resources allocation apparatus for multiple radio remote units sharing a cell. As shown in FIG. 5, the apparatus includes a reference signal measurement unit 51 and a selecting unit 52.

The reference signal measurement unit 51 is configured to measure a test value of a reference signal of a user equipment under each radio remote unit in the cell.

The selecting unit 52 is configured to select a radio remote unit with the maximum test value measured by the reference signal measurement unit as a work radio remote unit of the user equipment.

The resources allocation apparatus for multiple radio remote units sharing a cell provided in the embodiment of the present invention is capable of selecting, in a condition that multiple radio remote units share a cell, a corresponding work radio remote unit for a user equipment according to a test value of a reference signal of the user equipment under each radio remote unit in the cell, thereby reducing a waste of channel resources in resources allocation for the multiple radio remote units sharing a cell.

Further, the selecting unit 52 is further configured to calculate a difference between a test value of the reference signal of the user equipment under its work radio remote unit and that of the reference signal of the user equipment under another radio remote unit in the cell. If the difference is smaller than a preset value, select the another radio remote unit as a work radio remote unit at the same time. In this case, adopting multiple radio remote units to serve the user equipment at the same time is also beneficial to improving quality of service.

It should be noted that the test value of the reference signal described in this embodiment may be any one of the following: reference signal receiving power (RSRP); or signal to interference plus noise ratio (SINR) of a sounding reference signal (SRS); or signal to interference plus noise ratio (SINR) of a demodulation reference signal (DMRS).

Figure 6:
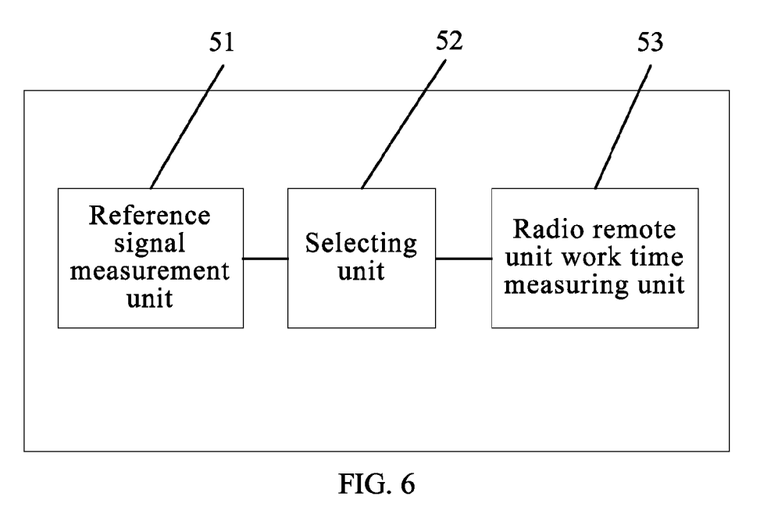
FIG. 6 is a block diagram of another resources allocation apparatus for multiple radio remote units sharing a cell according to Embodiment 3 of the present invention.

Furthermore, the apparatus in FIG. 6 further includes a radio remote unit work time measuring unit 53.

The radio remote unit work time measuring unit 53 is configured to, after the work radio remote unit is selected, measure a work time of the radio remote unit, so that when the work time reaches a preset time value, a work radio remote unit is reselected for the user equipment.

Here, because the user equipment is a mobile device, adding the radio remote unit work time measuring unit 53 is more beneficial to changing the work radio remote unit in time when the user equipment moves to a different location, thereby improving communication quality.

The solution provided in this embodiment of the present invention may also be applicable to scenarios where multiple radio remote units share a cell whose standard is GSM (global system for mobile communications), UMTS (universal mobile telecommunications system), WIMAX (worldwide interoperability for microwave access), or another radio standard. The apparatus provided in this embodiment of the present invention may be a base station in each of the preceding scenarios and may also be a unit set independently.

The resources allocation apparatus for multiple radio remote units sharing a cell provided in this embodiment of the present invention is capable of selecting, in a condition that multiple radio remote units share a cell, a corresponding work radio remote unit for a user equipment according to a test value of a reference signal of the user equipment under each radio remote unit in the cell, thereby reducing a waste of channel resources in resources allocation for the multiple radio remote units sharing a cell.

In addition, because the user equipment is a mobile device, the radio remote unit work time measuring unit is beneficial to changing the work radio remote unit in time when the user equipment moves to a different location, thereby improving communication quality.

Persons of ordinary skill in the art may understand that all or a part of the steps of the methods according to the embodiments of the present invention may be implemented by a program instructing relevant hardware. The program may be stored in a computer readable storage medium. When the program runs, the steps in the method embodiments are performed. The storage medium may be any medium that is capable of storing program codes, such as a ROM, a RAM, a magnetic disk, or an optical disk.

The foregoing describes only specific implementation manners of the present invention, but the protection scope of the present invention is not limited thereto. Any modification or substitution readily conceivable by a person skilled in the art within the scope of the technology disclosed in the present invention shall fall within the protection scope of the present invention. Therefore, the protection scope of the present invention is subject to the appended claims.

What is claimed is:

1. A method of resources allocation for a user equipment, wherein the user equipment locates a cell, and multiple radio remote units share the cell, comprising:
   measuring, by a base station, a test value of a reference signal of the user equipment in the cell under each of the multiple radio remote units; and
   selecting, by the base station, a work radio remote unit for the user equipment according to the test value of the reference signal of the user equipment in different situations, comprising:
   selecting, by the base station, one of the multiple radio remote units with a maximum test value as the work radio remote unit of the user equipment;
   calculating, by the base station, a difference between the test value of the reference signal of the user equipment under the work radio remote unit and another test value of the reference signal of the user equipment under another radio remote unit in the cell; and selecting, by the base station, the another radio remote unit as another work radio remote unit if the difference is smaller than a preset value;

wherein if the difference is not smaller than the preset value, the radio remote unit with the maximum test value is selected as the only work radio remote unit of the user equipment.

2. The method according to claim 1, wherein after the work radio remote unit is selected, the method further comprises:

measuring, by the base station, a work time of the work radio remote unit; and reselecting, by the base station, a new work radio remote unit for the user equipment when the work time of the work radio remote unit reaches a preset time value.

3. The method according to claim 1, wherein the test value of the reference signal comprises:

a reference signal receiving power; or, a signal to interference plus noise ratio of a sounding reference signal; or, a signal to interference plus noise ratio of a demodulation reference signal.

4. The method according to claim 3, wherein after the work radio remote unit is selected, the method further comprises:

measuring, by the base station, a work time of the work radio remote unit; and reselecting, by the base station, a new work radio remote unit for the user equipment, when the work time of the work radio remote unit reaches a preset time value.

5. A apparatus of resources allocation for a user equipment, wherein the user equipment locates a cell and multiple radio remote units share the cell, comprising:

a reference signal measurement unit, configured to measure a test value of a reference signal of the user equipment in the cell under each of the multiple radio remote units; and a selecting unit, configured to select a work radio remote unit for the user equipment according to the test value of the reference signal of the user equipment in different situations;

wherein the selecting unit is further configured to:

select one of the multiple radio remote units with a maximum test value measured by the reference signal measurement unit as a work radio remote unit of the user equipment;

calculate a difference between the test value of the reference signal of the user equipment under the work radio remote unit and another test value of the reference signal of the user equipment under another radio remote unit in the cell; and select the another radio remote unit as another work radio remote unit if the difference is smaller than a preset value;

wherein if the difference is not smaller than the preset value, the radio remote unit with the maximum test value is the only work radio remote unit of the user equipment.

6. The apparatus according to claims 5, further comprising:

a radio remote unit work time measuring unit, configured to, after the work radio remote unit is selected, measure a work time of the work radio remote unit so that when the work time of the work radio remote unit reaches a preset time value, a new work radio remote unit is reselected for the user equipment.

7. The apparatus according to claim 5, wherein the test value of the reference signal comprises:

a reference signal receiving power; or, a signal to interference plus noise ratio of a sounding reference signal; or, a signal to interference plus noise ratio of a demodulation reference signal.

8. The apparatus according to claim 7, further comprising:

a radio remote unit work time measuring unit, configured to, after the work radio remote unit is selected, measure a work time of the work radio remote unit so that when the work time of the work radio remote unit reaches a preset time value, a new work radio remote unit is reselected for the user equipment.

9. The apparatus according to claim 5, wherein the apparatus is a base station.

* * * * *

UNITED STATES PATENT AND TRADEMARK OFFICE
CERTIFICATE OF CORRECTION

| | | |
|---|---|---|
| PATENT NO. | : 8,761,791 B2 | Page 1 of 1 |
| APPLICATION NO. | : 13/717083 | |
| DATED | : June 24, 2014 | |
| INVENTOR(S) | : Zhou et al. | |

It is certified that error appears in the above-identified patent and that said Letters Patent is hereby corrected as shown below:

On the Title page, item [71], delete "Guangdong (CN)" and insert --Shenzhen (CN)--.

Signed and Sealed this
Seventh Day of October, 2014

Michelle K. Lee
*Deputy Director of the United States Patent and Trademark Office*